United States Patent
Cannon et al.

(10) Patent No.: US 7,043,012 B1
(45) Date of Patent: May 9, 2006

(54) METHOD AND APPARATUS FOR RING AGAIN FEATURE FOR A TELEPHONE SYSTEM

(75) Inventors: Joseph M. Cannon, Montgomery, PA (US); James A. Johanson, Lehigh, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/414,428

(22) Filed: Oct. 7, 1999

(51) Int. Cl.
  *H04M 1/00* (2006.01)
  *H04M 3/00* (2006.01)
(52) U.S. Cl. .................. 379/377; 379/378; 379/386; 379/418; 379/372; 379/373.01
(58) Field of Classification Search ................ 379/373.01–373.05, 61.1–87, 212.01, 418, 379/377–378, 386, 374.02
See application file for complete search history.

(56) References Cited

U.S. PATENT DOCUMENTS

| | | | |
|---|---|---|---|
| 4,125,748 A * | 11/1978 | Nahabedian | 379/212.01 |
| 4,266,098 A | 5/1981 | Novak | |
| 4,769,837 A * | 9/1988 | McCormick et al. | 379/212.01 |
| 4,866,766 A * | 9/1989 | Mitzlaff | |
| 5,048,080 A * | 9/1991 | Bell et al. | 379/165 |
| 5,086,458 A | 2/1992 | Bowen | |
| 5,204,861 A * | 4/1993 | Wiebe | |
| 5,247,570 A | 9/1993 | Bowen | |
| 5,263,084 A | 11/1993 | Chaput et al. | |
| 5,392,332 A | 2/1995 | Core et al. | |
| 5,432,844 A | 7/1995 | Core et al. | |
| 5,644,629 A | 7/1997 | Chow | |
| 5,668,853 A * | 9/1997 | Florence et al. | |
| 5,768,356 A * | 6/1998 | McKendry et al. | 379/212 |
| 5,905,786 A | 5/1999 | Hoopes | |
| 6,026,155 A * | 2/2000 | Takeuchi et al. | 379/211 |
| 6,263,061 B1 * | 7/2001 | Tanaka et al. | 379/212.01 |
| 6,339,639 B1 * | 1/2002 | Henderson | 379/142.08 |

FOREIGN PATENT DOCUMENTS

WO WO91/16796 * 10/1991

* cited by examiner

*Primary Examiner*—Sinh Tran
*Assistant Examiner*—Ramnandan Singh

(57) ABSTRACT

A method and apparatus for an automatic ring again feature on a telephone set for a user that answers a telephone call not intended for that user is disclosed. If a user has answered an incoming telephone call not intended for that user, a "Ring Again" feature on the telephone set is activated. In response to the Ring Again feature being activated, parallel telephone sets will ring again to allow a different user to answer the call or, alternatively, another device, such as an answering device, to answer the call.

39 Claims, 4 Drawing Sheets

METHOD AND APPARATUS FOR RING AGAIN FEATURE FOR A TELEPHONE SYSTEM

BACKGROUND OF THE INVENTION

1. Field of the Invention

The present invention relates generally to telephone systems and more particularly to a method and apparatus for an automatic ring again feature for a telephone line shared by multiple devices.

2. Description of the Related Art

It is often common for a number of telephone sets to be connected in parallel to the same telephone line. For example, in many residential homes, telephone sets are located in several rooms, such as for example one or more bedrooms, the kitchen, family room, den, etc. FIG. 1 illustrates in block diagram form a plurality of devices, such as for example telephone sets 20a, 20b, . . . 20n, sharing a single telephone line 22. Each of the telephone sets 20a–20n is connected in parallel to a single telephone line 22 via a junction box 24 to the Central Office 26 (CO) of the telephone company. The telephone installation illustrated is typical of a multiple extension system in a private household or small business. While three telephone sets are illustrated, the number of telephone sets connected to junction box 24 is not so limited.

If there are several users of the telephone line, often times the person who answers a telephone call is not the intended party. The person who answered the call then has to track down the intended party within the house, or alternatively, take a message which may never be received by the intended party. In some instances, the person who answered will ask the caller to call back at a later time, much to the caller's dismay.

One solution to this problem is to have a separate telephone line for each user within the house. In this way, a call can be directed to a specific user, and other residents of the household will know for whom the call is intended based on which telephone set is ringing. However, this solution has several disadvantages due to the significant cost to install several individual telephone lines, the wiring requirements inside any established building, and the cost associated with operation of several individual telephone lines.

Another solution is through the use of CallerID. CallerID can minimize the occurrence of the problem by letting a user know the origin of the phone call before it is answered. Thus, if a user sees that the call is not for him based on the CallerID information, he will not answer it. However, not all phones are equipped with CallerID boxes, and the CallerID does not always give sufficient information to determine exactly for whom the call is intended.

Thus, there exists a need for an apparatus and method that allows a user that has answered an incoming telephone call not intended for him to have the phones in the house ring again so a different user or an answering device can answer the call.

SUMMARY OF THE INVENTION

The present invention overcomes the problems associated with the prior art and provides a unique method and apparatus for an automatic ring again feature for a user who answers a telephone call not intended for him.

In accordance with the present invention, if a user has answered an incoming telephone call not intended for him, a "Ring Again" feature on the telephone is activated. In response to the Ring Again feature being activated, parallel telephone sets will ring again to allow a different user to answer the call or, alternatively, another, such as an answering device, to answer the call.

These and other advantages and features of the invention will become apparent from the following detailed description of the invention which is provided in connection with the accompanying drawings.

DETAILED DESCRIPTION

Figure 1:
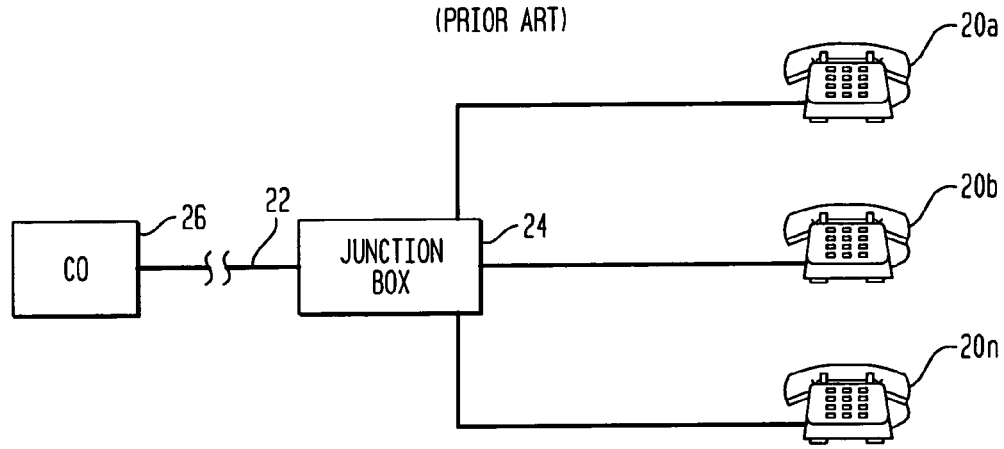
FIG. 1 illustrates in block diagram form a plurality of devices sharing a single telephone line.

The present invention will be described as set forth in the preferred embodiments illustrated in FIGS. 2–4. Other embodiments may be utilized and structural, logical or programming changes may be made without departing from the spirit or scope of the present invention. Like items are referred to by like reference numerals throughout the description. For the purposes of this discussion, a telephone set includes a base and a handset. Signals may be sent between the handset and base by a physical connection means, such as wire, or signals may be sent between the handset and base by a wireless signal, such as an RF signal.

In accordance with the present invention, if a user has answered an incoming telephone call not intended for him, a "Ring Again" feature on the telephone is activated. In response to the Ring Again feature being activated, the telephone sets connected to the telephone line will ring again to allow a different user to answer the call or, alternatively, another device connected to the telephone line, such as an answering device, to answer the call.

Figure 2A:
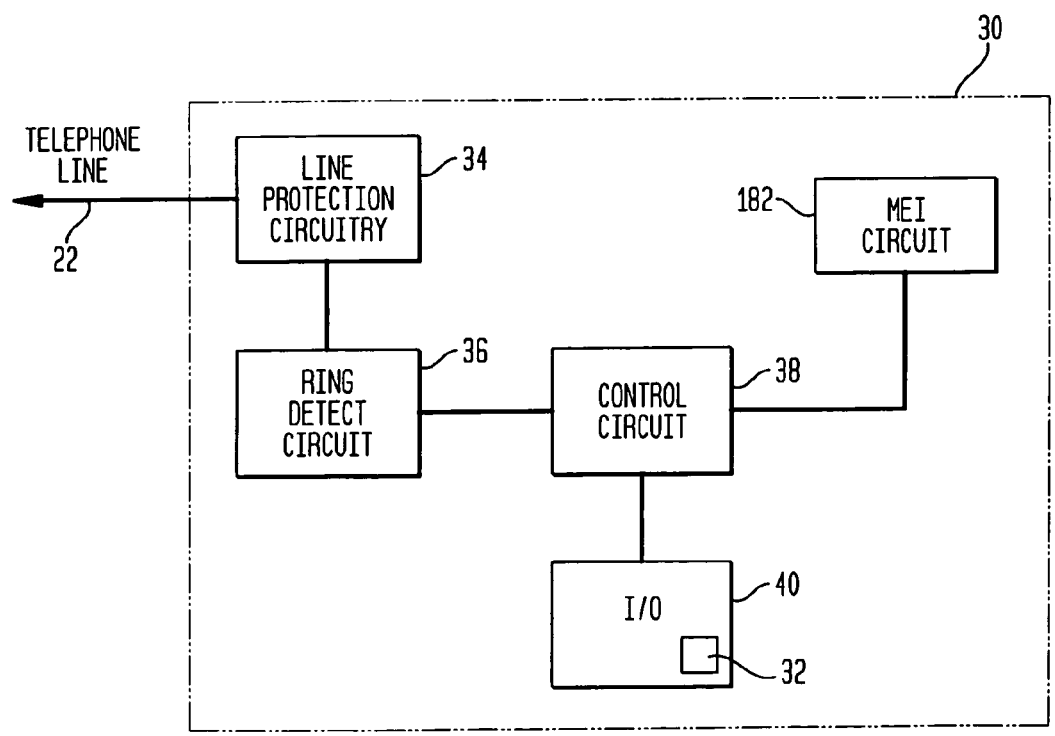
FIG. 2A illustrates in block diagram form a portion of a telephone set in accordance with the present invention.
Figure 3:
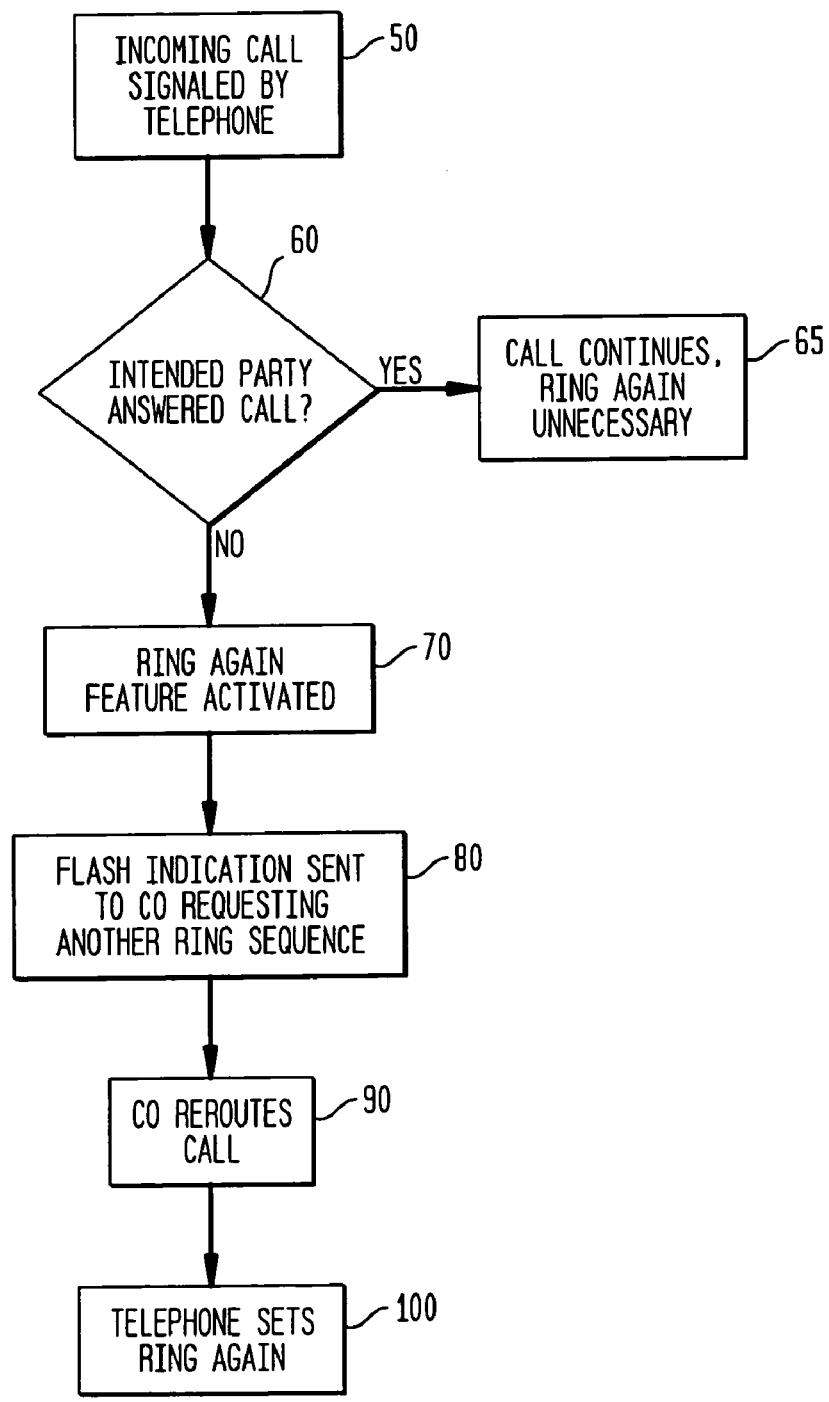
FIG. 3 illustrates in flow chart form a method for performing the automatic ring again feature in accordance with a first embodiment of the present invention.

FIG. 2A illustrates in block diagram form a portion of a telephone set 30 in accordance with the present invention. As is conventional, telephone set 30 comprises line protection circuitry 34 connected to a ring detect circuit 36. Ring detect circuit 36 detects an incoming telephone call on telephone line 22 to telephone set 30 and causes telephone set 30 to provide a visual and/or audible alerting signal, such as ringing. Ring detect circuitry 36 is connected to a control circuit 38. Control circuit 38 may include a microprocessor. Control circuit 38 is connected to an input/output device 40, such as for example a display and/or keypad. Telephone set 30 may also optionally include Multiple Extensions In-use (MEI) circuit 182, to be further described below, which is connected to control circuit 38. In accordance with the present invention, a "Ring Again" activator, such as button 32, is provided on telephone set 30, the operation of which will be further described below. Button 32 may be located on the base or the handset of the telephone 30, or it may be one of the number dialing or function keys of a conventional telephone set. Additionally, activation of the ring again feature may be performed by pressing a predetermined specific sequence of the number dialing or function keys.

Figure 2B:
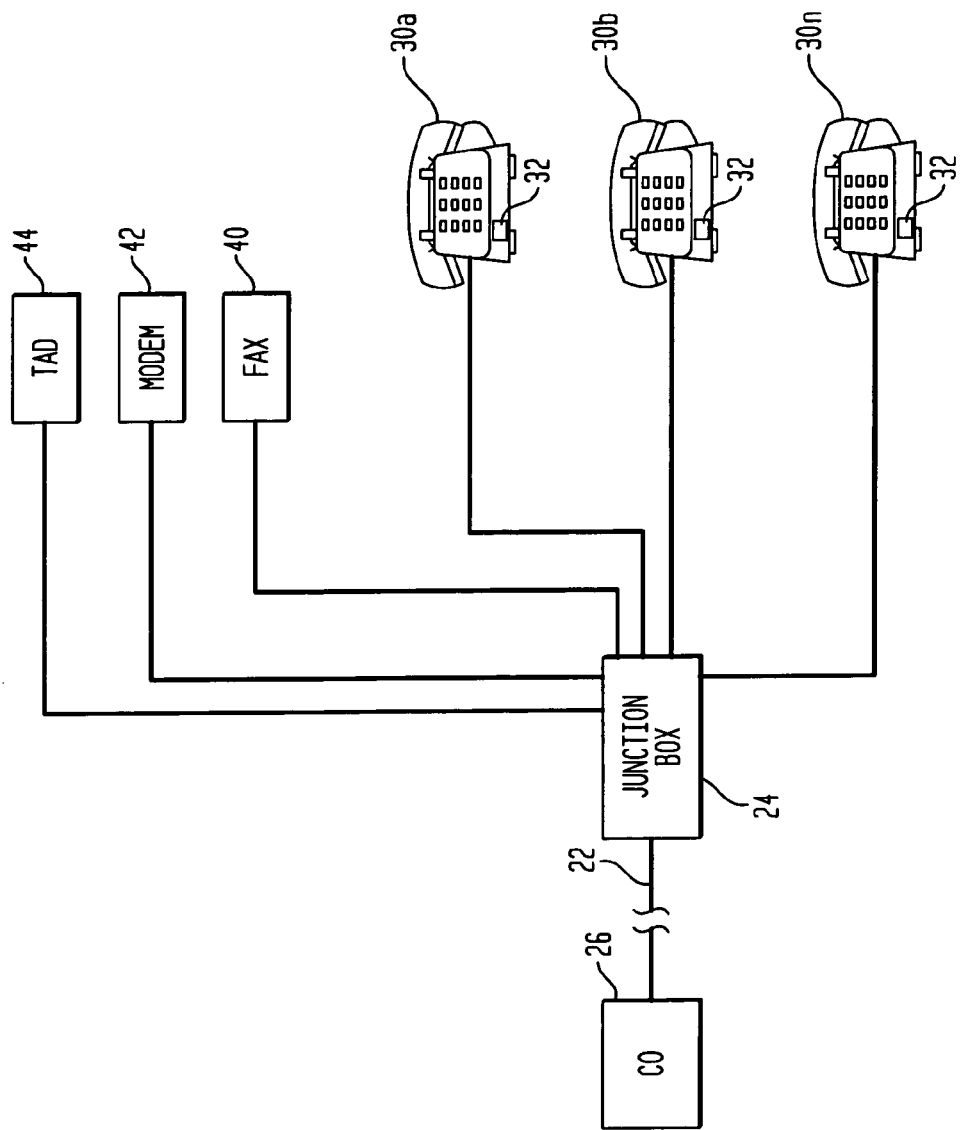
FIG. 2B illustrates in block diagram form a plurality of devices according to the present invention sharing a single telephone line.

FIG. 2B illustrates in block diagram form a plurality of parallel devices, such as for example telephone sets 30a, 30b, . . . 30n, in accordance with the present invention sharing a single telephone line 22. Each of the telephone sets 30a–30n is connected to a single telephone line 22 via a junction box 24 to the Central Office 26 (CO) of the telephone company. Again, it should be understood that while only three telephone sets are illustrated, the number of telephone sets connected to junction box 24 is not so limited and any number of telephone sets that could be supported by junction box 24 could be connected. Additionally, the devices connected to telephone line 22 via junction box 24 are not limited to telephone sets, and any device that requires use of a telephone line, such as for example a facsimile machine 40, computer modem 42, telephone answering device (TAD) 44, etc., may be connected to telephone line 22.

While each telephone set 30a–30n is illustrated as having button 32 as the ring again activator, the invention is not so limited and any number of telephone sets may be provided with button 32. However, only those telephone sets that have button 32 will be capable of initiating the automatic ring again feature in accordance with the present invention.

The operation of the telephone system illustrated in FIG. 2B will be described with respect to the flow charts of FIGS. 3 and 4. FIG. 3 illustrates in flow chart form a method for performing the automatic ring again feature in accordance with a first embodiment of the present invention. In this embodiment, the Central Office (CO) of the telephone company is used to implement the "Ring Again" feature.

In step 50, an incoming call through CO 26 is detected by ring detect circuit 36, as is known in the art, in telephone sets 30a–30n. Ring detect circuit 36 will cause its respective telephone set 30a–30n to signal the incoming call, such as for example by a visual and/or audible alerting signal. Suppose, for example, a user answers the incoming call on telephone set 30b. In step 60, the user determines if the call is intended for him, i.e., if the intended party answered the call. If the call is intended for the user that answered the phone, then in step 65 the user continues the call and the "Ring Again" feature is unnecessary. If the incoming call is not intended for the user that answered the call, in step 70 the user activates the "Ring Again" feature, such as for example by pressing button 32 on the telephone set 30b or pressing a predetermined sequence of keys on telephone set 30b.

In response to the "Ring Again" feature being activated in step 70, control circuit 38 in step 80 will "flash" the telephone line, as is known in the art, and automatically request another ring from CO 26 via Dual Tone Multi-Frequency (DTMF) or frequency shift keying (FSK) communications. In step 90, CO 26 will reroute the incoming call to telephone line 22, which will cause each of the telephone sets 30a–30n connected to telephone line 22 to ring again in step 100. Optionally, the telephone sets 30a–30n can be set to provide a short delay before the next ring to allow the user that originally answered the phone to use a CallerID function, if available, to ascertain that it is the same caller, i.e., the rerouted call, and not a different incoming call. If it is ascertained that it is the same caller, telephone set 30b can be set not to ring again, i.e., only the other telephone sets 30a and 30c–30n will ring again. A different user can then answer the incoming call, or alternatively a device connected to telephone line 22, such as for example TAD 44, can answer the call.

Figure 4:
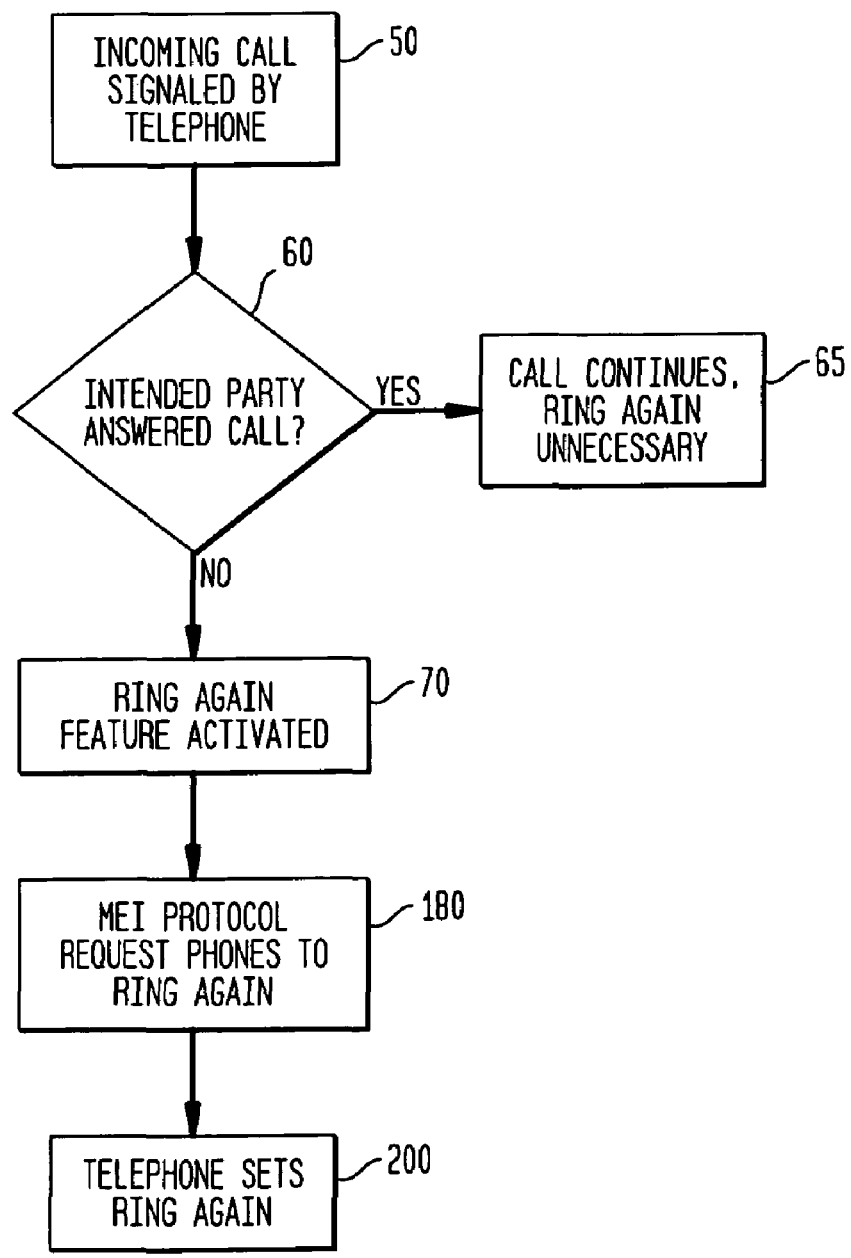
FIG. 4 illustrates in flow chart form a method for performing the automatic ring again feature in accordance with a second embodiment of the present invention.

FIG. 4 illustrates in flow chart form a method for performing the automatic ring again feature in accordance with a second embodiment of the present invention. In this embodiment, the telephone sets themselves are used to implement the "Ring Again" feature utilizing MEI circuit 182 (FIG. 2A) instead of the Central Office (CO) 26. MEI circuit 182 allows telephone sets connected to the same telephone line to communicate with each other via short flash bursts via established MEI protocol as is known in the art.

The operation of the method illustrated in FIG. 4 is similar to that of FIG. 3, except that after the "Ring Again" feature is activated in step 70, MEI circuit 182 is used to implement the "Ring Again" feature as follows. Suppose again a user answers the incoming call on telephone set 30b, determines the call is not for him, and activates the "Ring Again" feature by, for example, pressing button 32 or pressing a predetermined specific sequence of keys on telephone set 30b in step 70. In step 180, in response to the "Ring Again" feature being activated, telephone set 30b will become master of the MEI protocol and request all other telephone sets, i.e., telephone sets 30a–30n, connected to telephone line 22 that are equipped with MEI circuit 182 to ring again. Additionally, MEI circuit 182 of telephone set 30b can also request telephone set 30b to ring again if desired.

In response to MEI circuit 182 of telephone set 30b requesting a ring again, each of the telephone sets 30a–30n connected to telephone line 22 that are equipped with MEI circuit 182 will ring again in step 200. A different user can then answer the incoming call, or alternatively a device connected to telephone line 22, such as for example TAD 44, can answer the call.

While the invention has been described with respect to a plurality of devices connected in parallel to a telephone line 22, the invention is not so limited and can also be used with a plurality of parallel wireless devices, such as for example cellular telephones, which share a single telephone number.

Thus, in accordance with the present invention, if a user has answered an incoming telephone call not intended for him, a "Ring Again" feature on the telephone is activated which enables parallel telephone sets to ring again, thereby allowing a different user to answer the call or, alternatively, another device, such as an answering device, to answer the call.

Reference has been made to preferred embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Accordingly, the invention is not to be considered as limited by the foregoing description, but is only limited by the scope of the appended claims.

What is claimed as new and desired to be protected by Letters Patent of the: United States is:

1. A telephone set comprising:
 a ring detect circuit to detect a ring signal of an incoming telephone call on a telephone line, said telephone set indicating said incoming telephone call when said ring signal is detected by said ring detect circuit;
 a first control circuit connected to said ring detect circuit; and
 a ring again activator connected to said first control circuit, said first control circuit generating a first ring again control signal when said ring again activator is operated, wherein said ring detector circuit receives a second ring again control signal, generated by said central office in response to said first ring again control signal, which first control circuit causes said incoming telephone call to ring again on said telephone line.

2. The telephone set according to claim 1, wherein least one of said first and second ring again control signals is a DTMF signal.

3. The telephone set according to claim 1, wherein least one of said first and second ring again control signals is a FSK signal.

4. The telephone set according to claim 1, wherein said ring detect circuit is further adapted to wait a predetermined period of time after detecting said another ring signal before re-indicating said incoming telephone call.

5. The telephone set according to claim 1, further comprising:
a second circuit connected to said first control circuit, wherein said second control circuit, in response to said second ring again control signal, causes a parallel telephone set to re-indicate said incoming telephone call.

6. The telephone set according to claim 5, wherein in response to said second control signal, said second control circuit causes said telephone set to re-indicate said incoming telephone call.

7. The telephone set according to claim 5, wherein said second control circuit comprises a multiple extensions in use circuit.

8. The telephone set according to claim 1, wherein said ring again activator comprises a button on said telephone set.

9. The telephone set according to claim 8, where said button is located on a base of said telephone set.

10. The telephone set according to claim 8, wherein said button is located on a handset of said telephone set.

11. The telephone set according to claim 8, wherein said button is a dialing key on a keypad of said telephone set.

12. The telephone set according to claim 8, wherein said button is a function key on a keypad of said telephone set.

13. The telephone set according to claim 1, wherein said ring again activator comprises a predetermined sequence of keys on a keypad of said telephone set.

14. The telephone set according to claim 1, wherein said first control circuit includes a processor.

15. A communication system comprising:
a plurality of parallel telephones, each of said plurality of parallel telephones adapted to indicate an incoming telephone call, at least one of said plurality of parallel telephones comprising:
a first control circuit; and
a ring again activator connected to said first control circuit, said first control circuit generating a first ring again control signal to a central office when said incoming telephone call is answered at said at least one of said plurality of telephones and said ring again activator is thereafter activated,
wherein in response to said ring again control signal, said central office generates a second ring again control signal which causes at least some of said plurality of parallel telephones to re-indicate said incoming telephone call.

16. The communication system according to claim 15, wherein least one of said first and second ring again control signals is a DTMF signal.

17. The communication system according to claim 15, wherein at least one of said first and second ring again control signals is a FSK signal.

18. The communication system according to claim 15, wherein said at least some of said plurality of parallel telephones is to wait a predetermined period of time after said second ring again control signal before re-indicating said incoming telephone call.

19. The communication system according to claim 15, wherein said at least one of said plurality of telephones further comprises:
a second control circuit connected to said first control circuit,
wherein said second control circuit, in response to said second ring again control signal sends a third ring again signal to the other of said plurality of parallel telephones to cause at least some of said plurality of telephones to re-indicate said incoming telephone call.

20. The communication system according to claim 16, wherein said second control circuit includes a multiple extensions in use circuit.

21. The communication system according to claim 15, wherein said plurality of parallel telephone lines are connected to a telephone line.

22. The communication system according to claim 15, wherein said ring again activator comprises a button on said at least one of said plurality of said telephones.

23. The communication system according to claim 22, where said button is located on a base of said at least one of said plurality of said telephones.

24. The communication system according to claim 22, wherein said button is located on a handset of said at least one of said plurality of said telephones.

25. The communication system according to claim 22, wherein said button is a dialing key on a keypad of said at least one of said plurality of said telephones.

26. The communication system according to claim 22, wherein said button is a function key on a keypad of said at least one of said plurality of said telephones.

27. The communication system according to claim 15, wherein said ring again activator comprises a predetermined sequence of keys on a keypad of said at least one of said plurality of said telephones.

28. The communication system according to claim 15, wherein said first control circuit includes a processor.

29. The communication system according to claim 15, further comprising:
at least one other parallel device, said at least one other device adapted to answer said incoming telephone call.

30. The communication system according to claim 29, wherein said at least one other parallel device is a telephone answering device.

31. A method for re-indicating an incoming telephone call comprising the steps of:
operating a ring again activator after said incoming telephone call has been answered in response to an indication of said incoming telephone call; and
re-indicating said incoming telephone call in response to said ring again activator being operated
said re-indicating step comprising: sending a first control signal to a central office and
in response to said control signal, generating a second control signal to cause said re-indication of said incoming telephone call.

32. The method according to claim 31, wherein said step of sending a first control signal further comprises:
sending a DTMF signal.

33. The method according to claim 31, wherein said step of sending a first control signal further comprises:
sending a FSK signal.

34. The method according to claim 31, wherein said method further comprises:

waiting a predetermined period of time after said central office generates said second control signal before re-indicating said incoming telephone call.

35. The method according to claim 31, wherein said step of re-indicating further comprises:
    sending a third control signal from a device at which said telephone call was answered to at least one other parallel device; and
    in response to said third control signal, causing said re-indication of said incoming telephone call by said one other parallel device.

36. The method according to claim 35, wherein said step of sending a first control signal further comprises:
    sending a signal utilizing multiple extensions in use protocol.

37. The method according to claim 34, further comprising:
    re-indicating said incoming telephone call by at least one of a plurality of devices connected to a telephone line.

38. The method according to claim 37, wherein said plurality of devices includes a telephone set.

39. The method according to claim 37, wherein said plurality of devices includes a telephone answering device.

* * * * *